Feb. 20, 1962  J. LYMAN  3,021,569
METHODS AND MEANS FOR MAKING MOLDED PLASTIC ARTICLES
Filed Jan. 11, 1957

INVENTOR
JOSEPH LYMAN
BY
Campbell, Brumbaugh, Free & Graves
HIS ATTORNEYS

United States Patent Office

3,021,569
Patented Feb. 20, 1962

3,021,569
METHODS AND MEANS FOR MAKING MOLDED
PLASTIC ARTICLES
Joseph Lyman, West Neck Road, Lloyd Harbor,
Huntington, N.Y.
Filed Jan. 11, 1957, Ser. No. 633,730
5 Claims. (Cl. 18—56)

The present invention relates to the manufacture of articles out of plastic materials by casting in molds, and more particularly to new and improved mold making and casting methods and means that enable cast molded plastic articles of high quality to be produced quickly and inexpensively.

It has been proposed heretofore to manufacture plastic articles by casting plastic materials in suitable molds. In general, this has involved making a mold for the article, filling the mold with a suitable thermosetting casting resin and allowing the resin to set. Usually, conventional foundry practice has been followed in making the molds and they have been formed from a wide variety of materials including wood, plaster of Paris, glass and rubber. While molded plastic articles can be made in this way, the technique is not entirely satisfactory because of the time and expense involved in the production of the mold.

It is an object of the invention, accordingly, to provide a new and improved method of manufacturing articles by casting materials in molds which is free from the above-noted deficiencies of the prior art.

Another object of the invention is to provide a new and improved molding method and means of the above character which enables articles of good quality to be manufactured quickly and inexpensively.

A further object of the invention is to provide novel and highly effective molds that can be made rapidly and at low cost.

Still another object of the invention is to provide a simple and speedy method for making molds for use in casting operations.

In accordance with the invention, a vacuum molding technique is employed for making a single or multiple mold of the article to be manufactured. In a typical operation, a thin sheet of softened hardenable material is vacuum formed against a pattern or prototype of the article, provided with male parts to form feed and vent openings as required. The pressure of the outside air collapses the softened sheet around the prototype forming an accurate mold of the latter. The formed sheet is then hardened, whereupon it may be stripped from the pattern. A suitable liquid casting material is then poured into the mold and is allowed to set. The final molded product may be shipped in its mold or the mold may be stripped off as desired.

If a number of prototypes of the article are available, they may be used as patterns to form one or more multiple molds by the vacuum molding technique just described, which molds can be poured all at one time. Alternatively, a plurality of single units produced following the procedure outlined above may be used for this purpose.

It will be appreciated that the method is characterized by extreme speed and economy because the vacuum formed molds can be manufactured at great speed (a few seconds, usually). This is particularly true where multiple molds are made which can be poured in one operation.

The invention will be bettter understood from the following detailed description of several representative embodiments, taken in conjunction with the accompanying drawings, in which.

Figure 1:
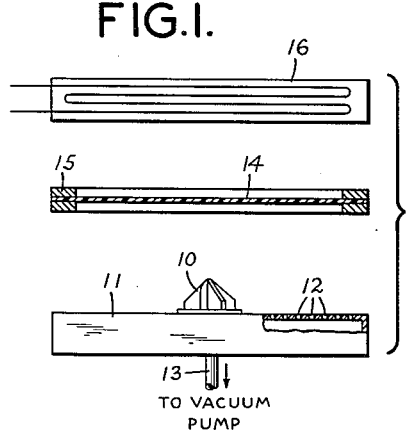
FIG. 1 illustrates schematically typical vacuum molding apparatus for constructing molds according to the invention.

A wide variety of articles may be manufactured by the molding technique of the invention and vacuum formed molds of different types may be employed for this purpose. For purposes of illustration, however, it will be necessary to describe herein only several typical procedures for producing representative molded articles by vacuum forming techniques according to the invention. FIG. 1 illustrates a simple technique for making a one-piece mold for producing plastic articles of irregular shape in accordance with the invention.

In FIG. 1, a pattern 10 of the article, which may be made of wood, metal or of a suitable plastic, is placed with its base resting on a vacuum box 11 comprising an enclosure provided with a plurality of closely-spaced small openings 12 in its upper surface. The interior of the box 11 is adapted to be maintained under vacuum by conventional vacuum pumping equipment (not shown) to which it is connected by tubing 13.

In order to make a mold of the article 10, a sheet 14 of thermoplastic material is first coated with a suitable parting compound and is mounted in a supporting frame 15 with the coated side towards the article 10. The sheet 14 may be made of any suitable thermoplastic material such as cellulose acetate or vinyl resin, for example, between .010 inch and .050 inch in thickness, depending upon the detail present in the original article 10, although the thickness is not critical. Preferably, a high temperature silicone grease sold under the designation "Dow Corning No. 7" is used as the parting compound.

The frame 15 is then positioned for heating of the sheet 14 by a conventional electric or other heater 16, and heating is continued until the thermoplastic material has softened sufficiently to be vacuum formed. For cellulose acetate sheets about .015 inch thick, upon heating, an initial sag occurs which is followed by tensioning and a second sagging. When the material has reached the latter stage, it usually is soft enough for vacuum molding.

The frame 15 with the softened cellulose acetate sheet 14 in it is then lowered over the article 10 until the bottom of the frame rests on the upper surface of the vacuum box 11. Since this places the volumn lying between the upper surface of the box 11 and the softened sheet 14 under vacuum, the sheet 14 immediately collapses against the pattern 10, forming an accurate mold of the latter. Upon cooling and hardening, the mold may be removed in any conventional manner as by the application of an air blast, for example. Because of the presence of the silicone grease parting compound, separation of the finished mold from the pattern is easily accomplished.

Figure 2:
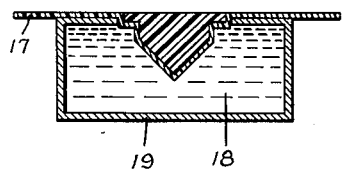
FIG. 2 is a view in vertical section of a mold made by the apparatus shown in FIG. 1 into which a casting resin has been poured.

After the mold 17 has cooled and set, it is inverted and any suitable casting resin may be poured into it as shown in FIG. 2. If the density of the casting material is high enough as to be likely to deform the thin wall of the mold, a liquid 18 of approximately the same density may be poured into a container 19 beneath the mold and maintained at about the same level as the level of the casting material inside the mold as the latter is being poured. In this way, any pressure differential between the inside and the outside of the mold is minimized so that pouring of the casting can be effected without deformation.

The casting material may be any one of a number of casting resins that are now available on the market, such as the polyesters or polyamide resins. If desired, any one of a large variety of filler materials, such as Bakelite "microballoons," chopped glass, and Monsanto "Santocel" may be incorporated in the resin together with any one of a variety of pigments depending upon the properties desired for the final product.

When the poured resin has hardened sufficiently, the mold 17 may be stripped away from the molded article. Alternatively, the mold 17 may be retained and used as a storage or shipping container.

Figure 3:
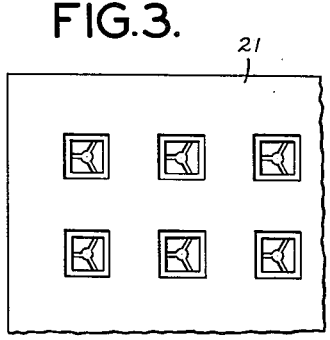
FIG. 3 is a partial plan view of a multiple mold for producing reproductions of the article shown in FIG. 1.

For optimum efficiency in manufacturing molded products in quantity, obviously multiple molds are essential. To make a multiple mold according to the invention, a specified number, say one dozen pieces, are first produced by sequential operation in the manner described above. These dozen pieces are then used as patterns to form a multiple mold 21 of the type shown in FIG. 3. One multiple mold of this type can be made on each vacuum molded draw enabling a dozen plastic pieces to be poured in a single pouring operation.

Where a part produced by casting in a mold constructed according to the invention is used as a pattern from which another mold is to be made, care should be taken to allow for the shrinkage (usually predicable) which may be expected in the cast product. This may be done, for example, by building up the cast product pattern as, for example, by affixing one or more sheets of thermoplastic material of proper thickness to it by vacuum forming, in the manner described above. The built up plastic pattern may then be used as a pattern from which other molds may be made.

Figure 4:
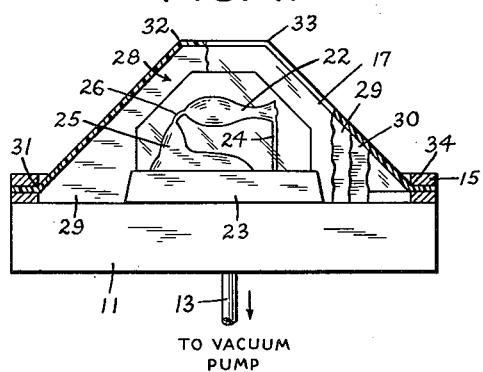
FIG. 4 is a view in elevation illustrating how a two-piece mold of an article may be made according to the invention.
Figure 5:
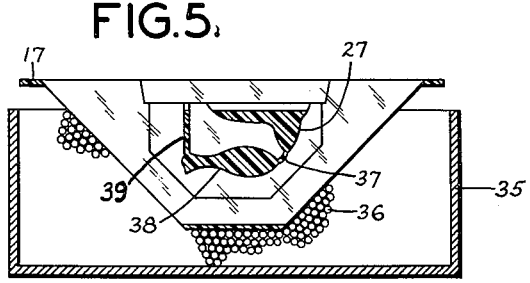
FIG. 5 is a view in vertical section showing the mold of FIG. 4 filled with a casting resin.

FIG. 4 illustrates a typical procedure for making a two-piece mold by a vacuum molding technique in accordance with the invention. In this embodiment, it will be assumed that it is desired to make a mold for a fish lure, for example. An existing piece may be used as a pattern or a special pattern may be made of wood, metal or other suitable material. The pattern 22 may be supported on a base 23 of wood, or other suitable material, by a narrow rod 24 cemented to one end of the pattern 22 and by a curved rod 26 cemented at the front end of the pattern 22. The other end of the rod 26 is secured to a body 25 which is shaped so as to form in the finished mold a funnel-shaped space into which the casting material may be poured. The body 25 may be made of any suitable material such as wood, plaster, metal or molding clay, for example. The rod 24 serves to form a vent enabling air to escape from the mold as the casting material is being poured. Similarly, the curved rod 26 forms a pour passage in the mold through which the casting material may enter the mold.

Secured to the base 23 is a frame 28 which preferably lies in a vertical plane through the center of the pattern 22. In order to facilitate removal of the finished mold, the frame 28 preferably comprises a pair of superimposed flat members 29 and 30 of wood or metal having a separation line therebetween into which a knife or other sharp tool may be inserted. Alternatively, the frame 28 may comprise a solid piece of material having a groove formed in the sides thereof into which a cutting tool may be inserted.

The pattern assembly for the fish lure, when completed, is placed on the top of the vacuum box 11, as shown in FIG. 4, and a frame carrying a softened sheet of thermoplastic material is then placed in position as described above so that the softened sheet is collapsed against the pattern due to the vacuum within the box 11. After the mold has cooled and hardened, it is removed from the frame 15 and slitted between the points 31, 32 and 33, 34 by inserting a knife into the space between the frame members 29 and 30. The two sides of the mold may now be pulled away from the pattern 22, the mold portion 32, 33 serving as a hinge.

The parting silicone compound previously applied to the mold is then removed in the portions immediately surrounding the mold cavity by use of a suitable solvent, such as dimethyl ketone, for example. A thin coating of a suitable cement such as dimethyl ketone is now applied to these portions and the two sides of the mold are pressed together in proper registry to form the completed mold. After the cement has hardened, the mold is inverted and is placed on a support which may be a container 35, for example. In order to prevent deformation of the mold due to the density of the casting material, the container may be filled with suitable material of proper weight, such as, for example, lead shot 36. The fluid casting material is then poured into the funnel-shaped portion 27 from which it flows through the passage 37 to the mold cavity 38. During the pouring operation, it will be understood that any air within the mold is vented through the vent 39. Preferably, an excess of molding material should be used so as to inhibit the formation of bubbles in the finished product.

After the casting material has hardened, the two sides of the mold may be pulled away to free the cast fish lure product. Any flashing may then be cleaned off in the conventional manner with a knife or other suitable tool.

The invention thus provides a novel and highly effective technique for casting plastic articles. Since it utilizes vacuum formed molds which can be manufactured quickly and easily, extreme speed and economy in operation may be readily achieved. Further, molds of extremely thin section may be used enabling patterns of the highest possible detail to be accurately reproduced. For example, if a leather covered pattern is used, the texture of the leather will be faithfully reproduced in the finished article. By the same token, a very high gloss finish can readily be obtained if the basic pattern has a high polish.

In the interest of simplicity, the vacuum molding apparatus is disclosed herein only schematically. In actual practice, however, commercially available automatic vacuum molding apparatus should desirably be employed in order to achieve maximum production speeds. Also, any of the well-known techniques currently employed in vacuum molding practice might be used as required to insure finished articles of good quality and high production rates.

For example, it may be desirable to provide minute holes in the pattern at all points where a heavy draw is required (e.g. where surfaces intersect at sharp angles), in accordance with the usual vacuum forming practice. Parts may be inserted to form the "web" away from places where it is not wanted and for mold stiffness various corrugations, ribs, etc., external to the mold cavity itself, may be vacuum formed into the molds at the time they are drawn. Also, spaces may be left in the mold to allow for the insertion of tape having a coating of adhesive on both sides to hold the opposite halves of a mold together; other expedients will be readily apparent to those skilled in the art.

It will be understood that the representative techniques and means described above are susceptible of modification in form and detail within the spirit of the invention. Accordingly, the invention is not to be restricted to the specific embodiments disclosed but comprehends all modifications thereof falling within the scope of the following claims.

I claim:

1. In a method for making molds for cast reproductions of an object, the steps of vacuum forming sheet portions of soft hardenable material against opposite sides of an object, thereby forming in said respective sheet portions accurate impressions of opposite sides of said object adapted to constitute opposed mold portions surrounded by laterally extending engaged boundary portions, allowing said formed sheet portions to harden, separating said sheet portions, removing said sheet portions from the object, and bringing said sheet portions together with said opposed mold portions in accurate registry to form a mold.

2. In a method for making molds for cast reproductions of an object, the steps of disposing an object within a flat frame adapted to establish a mold separation plane, vacuum forming thin sheet portions of soft hardenable material against opposite sides of said object and frame to form in said respective sheet portions accurate impressions of opposite sides of said object adapted to constitute opposed mold portions surrounded by laterally extending engaged portions, allowing said sheet portions to harden, separating said sheet portions, and removing said sheet portions from the object.

3. In a method for making molds for cast reproductions of an object, the steps of disposing an object within a flat frame adapted to define a mold separation plane, vacuum forming a thin sheet of softened thermoplastic material over said object and frame to form in said sheet accurate impressions of opposite sides of said object adapted to constitute opposite mold portions surrounded by laterally extending engaged portions, allowing said sheet to harden, cutting said sheet approximately in said separation plane to facilitate its removal from the object, and stripping said formed hardened sheet from said frame and object.

4. In a method for making molds from a pattern having portions representing an article to be reproduced and pour and vent passages, the steps of disposing said pattern within a flat frame having means formed in the sides thereof defining a mold separation plane, softening a thin sheet of thermoplastic material by the application of heat, vacuum forming said softened sheet over said pattern and frame to form in said sheet accurate impressions of opposite sides of said pattern adapted to constitute opposite mold portions surrounded by laterally extending engaged portions, allowing said sheet to harden by cooling, cutting said sheet in said mold separation plane to form two mold portions attached by a portion serving as a hinge, and stripping said formed hardened sheet from said frame and pattern.

5. A method for making cast reproduction of an object from a pattern having portions representing respectively the object to be reproduced and pour and vent passages and mounted in a frame adapted to define a mold separation plane, comprising applying a high temperature silicone grease to an area of a thin sheet of thermoplastic material, softening the sheet by heating, vacuum forming the sheet with the side thereof carrying the silicone grease against said pattern and frame to form therein accurate impressions of opposite sides of the object adapted to constitute opposed cooperating mold portions surrounded by laterally extending engaged portions defining a mold separation plane and pour and vent passages communicating with said mold portions, allowing the formed sheet to harden by cooling, cutting the formed sheet in said separation plane to facilitate separation of said mold portions of the sheet, stripping the formed sheet from the pattern, removing the silicone grease from areas of the laterally extending portions surrounding the mold portions, cementing opposed laterally extending sheet portions from which silicone grease has been removed, to maintain said laterally extending sheet portions tightly engaged, positioning the mold to contain a liquid in contact with said impressions, filling said mold through said pour passage with a liquid casting resin and causing the resin to set to form a reproduction of said object.

References Cited in the file of this patent
UNITED STATES PATENTS

| | | |
|---|---|---|
| 1,622,325 | Levy | Mar. 29, 1927 |
| 1,776,622 | Errington et al. | Sept. 23, 1930 |
| 2,493,439 | Braund | Jan. 3, 1950 |
| 2,517,701 | Oettinger | Aug. 8, 1950 |
| 2,531,218 | Johnson | Nov. 21, 1950 |
| 2,601,700 | Pinsky et al. | July 1, 1952 |
| 2,662,248 | Ames | Dec. 15, 1953 |
| 2,664,593 | Larson | Jan. 5, 1954 |
| 2,690,593 | Abercrombie | Oct. 5, 1954 |
| 2,691,188 | Goodfellow | Oct. 12, 1954 |
| 2,694,227 | Fordyce et al. | Nov. 16, 1954 |
| 2,698,968 | Callahan et al. | Jan. 11, 1955 |
| 2,749,572 | Nowak | June 12, 1956 |

FOREIGN PATENTS

| | | |
|---|---|---|
| 391,230 | Great Britain | Apr. 27, 1933 |

OTHER REFERENCES

"Vacuum Forming," published in Modern Plastics, vol. 31, No. 9, May 1954 (pp. 90, 91).

"Plastics Engineering Handbook" (The Society of the Plastics Industry), Reinhold Publishing Corp., New York, 1954 (pp. 59, para. 2, 179–186).

"Styrene, Its Polymers, Copolymers and Derivatives" (Boundy and Boyer), published by Reinhold Pub. Corp., New York, 1954 (pp. 1129–1132 relied upon).